United States Patent
Bilobrov et al.

(10) Patent No.: US 9,258,604 B1
(45) Date of Patent: Feb. 9, 2016

(54) COMMERCIAL DETECTION BASED ON AUDIO FINGERPRINTING

(71) Applicant: Facebook, Inc., Menlo Park, CA (US)

(72) Inventors: Sergiy Bilobrov, Santa Clara, CA (US); Iouri Poutivski, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/552,039

(22) Filed: Nov. 24, 2014

(51) Int. Cl.
*H04H 60/32* (2008.01)
*H04N 21/439* (2011.01)
*H04N 21/44* (2011.01)
*H04N 21/81* (2011.01)
*H04N 21/466* (2011.01)

(52) U.S. Cl.
CPC ..... *H04N 21/4394* (2013.01); *H04N 21/44008* (2013.01); *H04N 21/4665* (2013.01); *H04N 21/812* (2013.01)

(58) Field of Classification Search
CPC ............................................... H04N 21/44008
USPC ..................................................... 725/18–19
See application file for complete search history.

(56) References Cited

U.S. PATENT DOCUMENTS

| | | | | |
|---|---|---|---|---|
| 2004/0122679 | A1* | 6/2004 | Neuhauser | H04H 20/33 704/500 |
| 2011/0289098 | A1* | 11/2011 | Oztaskent | G06F 17/30026 707/769 |
| 2014/0013352 | A1* | 1/2014 | Shavit | H04N 21/8358 725/34 |

OTHER PUBLICATIONS

U.S. Appl. No. 14/153,404, filed Jan. 13, 2014, Inventors: Bilobrov et al.

\* cited by examiner

*Primary Examiner* — Olugbenga Idowu
(74) *Attorney, Agent, or Firm* — Fenwick & West LLP

(57) ABSTRACT

A commercial detection system generates a probe audio fingerprint of an audio signal associated with a media stream on a broadcast channel and determines whether the media stream has commercial content based on analysis of the probe audio fingerprint. The commercial detection system determines whether a same match between the probe audio fingerprint and a reference audio fingerprint is observed across multiple broadcast channels. Responsive to the number of same matches exceeding a predetermined threshold, the commercial detection system determines that the media stream has commercial content. The commercial detection system may also apply a trained feature analysis model to extracted acoustic features of the audio signal. The commercial detection system determines whether the media stream has commercial content based on a confidence score assigned to the probe audio fingerprint. The commercial detection system reduces false positive detection using program guide information of the media stream.

18 Claims, 6 Drawing Sheets

COMMERCIAL DETECTION BASED ON AUDIO FINGERPRINTING

BACKGROUND

This disclosure generally relates to content identification, and more specifically to detecting commercials in media streams based on audio fingerprinting.

Commercial detection in media streams has become increasingly important because many media streams, such as TV broadcasting, include commercials between segments of media programs. A media stream can be an audio stream, a video stream or a combined audio and video stream (also called "audio-visual stream"). Commercials can appear in audio streams or audio-visual streams, such as advertisements on broadcast radio and television stations, and songs or video on music channels.

Existing content-based identification systems use various approaches, such as a feature-based approach and a recognition based approach to detect commercials in media streams. A feature-based approach typically uses some inherent characteristics of TV commercials to differentiate commercials from non-commercial media content. For example, a feature-based approach may rely on the detection of scene changes in video frames or the detection of black frames at the beginning and end of a TV commercial. A recognition based approach attempts to identify commercials in a media stream using a database of known commercials. However, both approaches are computationally expensive and often require large storage space.

Another method of content-based identification is audio fingerprinting. An audio fingerprint is a compact summary of an audio signal that can be used to perform content-based identification. For example, an audio fingerprint of an unidentified audio signal is compared to reference audio fingerprints for identification of the audio signal. Some existing solutions of commercial detection using audio fingerprints of an audio portion of a media stream often generate an unnecessarily large number of false positive identifications because the existing solutions fail to differentiate commercial content from repeating real media content. For example, a signature tune of a particular TV program may repeat each time the particular TV program is aired. Thus, existing solutions of commercial detection using audio fingerprints fail to accurately detect commercials in media streams.

SUMMARY

A commercial detection system generates a probe audio fingerprint of an audio signal associated with a media stream on a broadcast channel and determines whether the media stream has commercial content based on an analysis of the probe audio fingerprint. The commercial detection system reduces false positive detection using program guide information of the media stream and verifies the commercial detection across multiple media streams on different broadcast channels. For example, the commercial detection system determines whether the same match is observed across multiple broadcast programs and/or multiple broadcast channels over a specified period of time. Responsive to the number of same matches exceeding a predetermined threshold, the commercial detection system determines that the media stream associated with the probe audio fingerprint contains commercial content.

Embodiments of the commercial detection system improve commercial detection by supplementing the method above with a trained analysis model and/or detection verification using program guide information. In one embodiment, the commercial detection system extracts multiple acoustic features in a frequency domain and a time domain from the audio signal associated with the media stream, e.g., spectral features computed on the magnitude spectrum of the audio signal, Mel-frequency cepstral coefficients (MFCC) of the audio signal, a spectral bandwidth and spectral flatness measure of the audio signal, a spectral fluctuation, extreme value frequencies, and silent frequencies of the audio signal. The system then applies a trained feature analysis model to the extracted features of the audio signal. The feature analysis model can be trained using one or more machine learning algorithms to analyze selected acoustic features of audio signals. The commercial detection system assigns a confidence score to the probe audio fingerprint based on the analysis of the acoustic features and the confidence score indicates a likelihood that the media stream associated with the probe audio fingerprint has commercial content. A higher confidence score associated with a media stream indicates that the media stream is more likely to have commercial content than a media stream having a lower confidence score. The commercial detection system determines whether the media stream has commercial content based on the confidence score.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
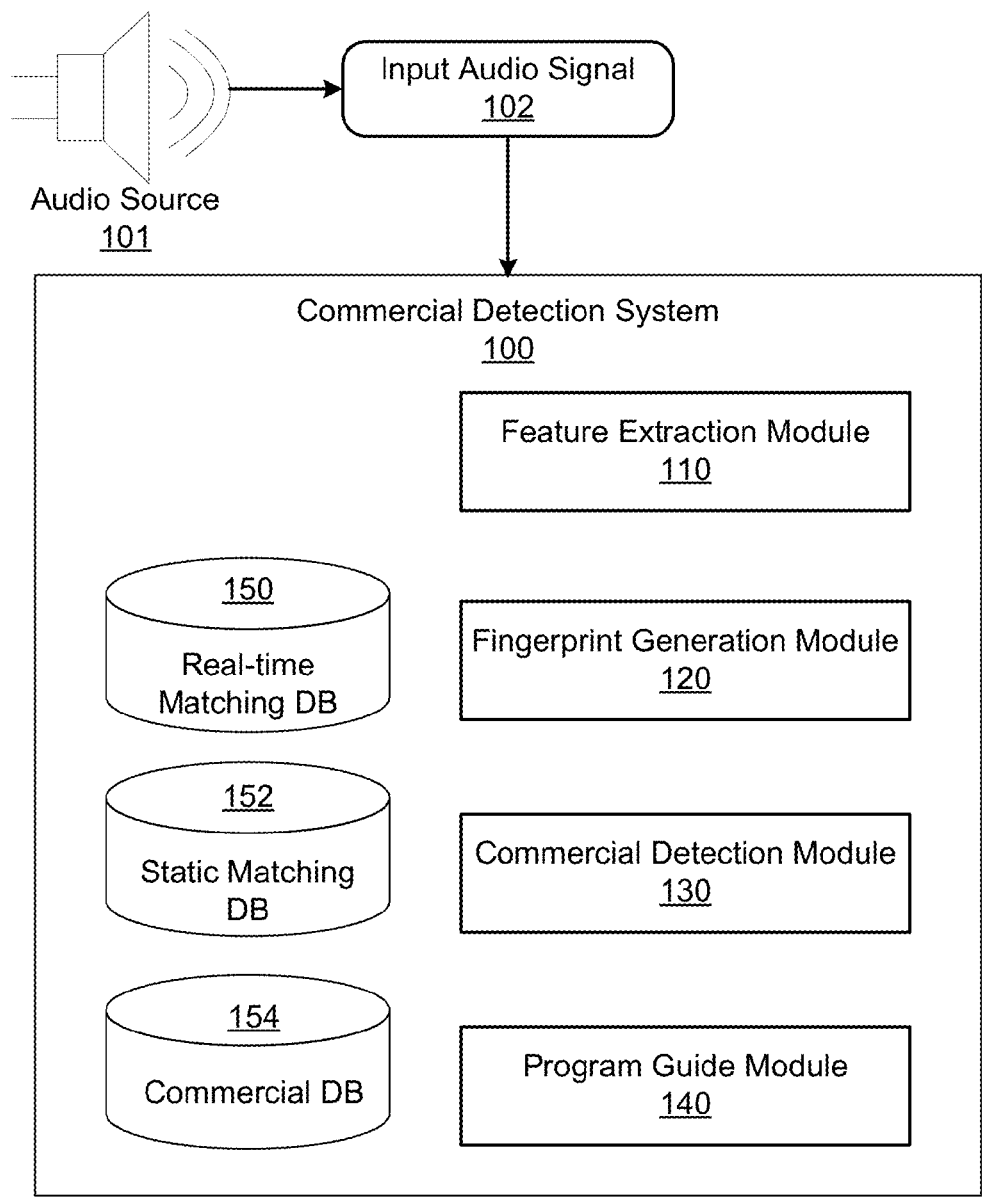
FIG. 1 is a block diagram of a commercial detection system in accordance with an embodiment.

Embodiments of the invention enable commercial detection in media streams based on audio fingerprints. FIG. 1 shows an example embodiment of a commercial detection system 100 for detecting commercials in a media stream (not shown) based on identification of audio portion of the media stream, i.e., audio source 101. As shown in FIG. 1, the commercial detection system 100 has a feature extraction module 110, a fingerprint generation module 120, a commercial detection module 130 and a program guide module 140. Additionally, the commercial detection system 100 has a real-time matching database 150, a static matching database 152 and a commercial database 154 for storing various types of audio fingerprints. Some embodiments of the commercial detection system 100 do not include all of these modules and/or databases or include different modules and/or databases. The commercial detection system 100 receives an audio signal 102 generated by an audio source 101, e.g., audio portion of TV broadcast, extracts one or more acoustic features from the audio signal 102 by the feature extraction module 110, generates an audio fingerprint of the audio signal 102 by the fingerprint generation module 120, detects commercials in the media stream by the commercial detection module 130 and verifies the commercial detection by the program guide module 140.

As shown in FIG. 1, an audio source 101 generates the audio signal 102. The audio source 101 may be any entity suitable for generating audio (or a representation of audio), such as a person, an animal, speakers of a mobile device, a desktop computer transmitting a data representation of a song, or other suitable entity generating audio. The audio source 101 can be the media streams provided by media content providers, such as broadcast audio and video from radio and TV stations. The audio signal 102 comprises one or more discrete audio frames, each of which corresponds to a fragment of the audio signal 102 at a particular time. Hence, each audio frame of the audio signal 102 corresponds to a length of time of the audio signal 102, such as 25 ms, 50 ms, 100 ms, 200 ms, etc.

In one embodiment, upon receiving the one or more audio frames of the audio signal 102, the feature extraction module 110 extracts one or more acoustic features from the audio signal 102. Examples of the acoustic features extracted from the audio signal 102 include acoustic features in frequency domain, such as spectral features computed on the magnitude spectrum of the audio signal 102, Mel-frequency cepstral coefficients (MFCC) of the audio signal 102, spectral bandwidth and spectral flatness measure of the audio signal 102, a spectral fluctuation, extreme value frequencies, and silent frequencies of the audio signal 102. Some embodiments of the system 100 do not perform a feature extraction, and so may not include a feature extraction module 110.

The acoustic feature extracted from the audio signal 102 also includes acoustic features in temporal domain, such as the mean, standard deviation and the covariance matrix of feature vectors over a texture window of the audio signal 102. Other embodiments of the feature extraction module 110 may include additional and/or different acoustic features extracted from the audio signal 102, such as volume changes of the audio signal 102 over a period of time and compression format of the audio signal 102 if the audio signal 102 is compressed. The extracted acoustic features of the audio signal 102 can be used to train an audio feature analysis model using machine learning. The commercial detection module 130 can use the trained analysis model to enhance the accuracy and performance of commercial detection.

The fingerprint generation module 120 generates an audio fingerprint from one or more of the audio frames of the audio signal 102. For simplicity and clarity, the audio fingerprint of the audio signal 102 is referred to as a "probe audio fingerprint" throughout the entire description. The probe audio fingerprint of the audio signal 102 may include characteristic information describing the audio signal 102. Such characteristic information may indicate acoustical and/or perceptual properties of the audio signal 102. In one embodiment, the fingerprint generation module 120 preprocesses the audio signal 102, transforms the audio signal 102 from one domain to another domain, filters the transformed audio signal and generates the audio fingerprint from the further transformed audio signal. One example of the fingerprint generation module 120 is discrete cosine transform (DCT) based audio fingerprint generation described in U.S. application Ser. No. 14/153,404, which is incorporated by reference herein in its entirety.

The commercial detection module 130 detects commercials in a media stream based on the audio fingerprints associated with the audio signals of the media stream. To detect commercials based on the probe audio fingerprint of the audio signal 102, the commercial detection module 130 matches the probe audio fingerprint of the audio signal 102 against reference audio fingerprints stored in at least one of the real-time matching database 150, the static matching database 152 and the commercial database 154. Based on the comparison and a predetermined threshold, the commercial detection module 130 determines whether commercials are present in the media stream. Alternatively, the commercial detection module 130 applies a trained analysis module to the acoustic features associated with the media stream for commercial detection. Embodiments of the commercial detection module 130 are further described below with references to FIGS. 3-6.

The program guide module 140 interacts with the commercial detection module 130 to verify the commercial detection results. A same commercial can repeat on a same broadcast channel and on other broadcast channels at various times, e.g., a few minutes later or months later. Similarly, real media content (e.g., commercial-free media content) can also repeat on the same or different broadcast channels. For example, a signature tune of a particular TV program (e.g., "Friends") may repeat each time the particular TV program is aired. An audio fingerprint for the signature tune can be found across multiple broadcast channels at different times (e.g., many TV stations broadcast "Friends" over different TV channels at different times). The commercial detection module 130 may false positively identify the audio fingerprint for the signature tune as a commercial because the number of repetitions of the signature tune across multiple broadcast channels has exceeded a predetermined threshold. The program guide module 140 can reduce false positive detection using program guide information for media streams.

In one embodiment, the program guide module 140 has a local storage to store program guide information (e.g., scheduling information) for known TV shows for TV broadcast channels and for songs and playlists for music channels and audio stations. The program guide information for a given show may be provided by the content provider of the given show and the program guide information includes starting and ending times for each commercial to be broadcast with the given show. Using the TV show "Friends" as an example, the broadcast station for the show may provide a program guide that indicates that after every 10 minutes of the show, there is a TV advertisement for 10 seconds.

The program guide module 140 verifies the detection using program guide information to reduce false positive detection. For example, if the signature tune of "Friends" appears on a broadcast channel at a time slot, which matches the time slot scheduled for "Friends" for the broadcast channel, the program guide module 140 can flag the identification as a potential false positive identification. It can further compare the audio fingerprint of the signature tune with a reference fingerprint for the signature tune and evaluate the detection based on the comparison.

Reference audio fingerprints are stored in various audio fingerprints databases of the commercial detection system 100. The real-time matching database 150 stores audio fingerprints generated for audio signals received by the commercial detection system 100, such as the probe audio fingerprint for the audio signal 102. In one embodiment, the real-time matching database 150 stores audio fingerprints for audio signals sampled from media streams, e.g., TV talk shows and movies, broadcasted over two hundred broadcast channels in a seven-day time window. The audio fingerprints stored in the real-time matching database 150 are updated periodically (e.g., daily) or upon request. The number of broadcast channels and size of the time windows are configurable design parameters. Different embodiments of the real-time matching database 150 can store audio fingerprints from a different number of broadcast channels and/or different time window sizes.

A match between the probe audio fingerprint of the audio signal 102 and a reference fingerprint stored in the real-time matching database 150 indicates that the media stream associated with the audio signal 102 may have commercial content. The detection of possible commercial content based on the match is not deterministic, i.e., the detection may be a false positive. For example, a match between a probe audio fingerprint of a song and a reference audio fingerprint stored in the real-time matching database 150 may not positively identify the media content associated with the probe audio fingerprint as a commercial because the song can be a sound track for an advertisement or a real song broadcast by a radio station.

The static matching database 152 stores reference audio fingerprints generated for audio signals received by the commercial detection system 100, where the audio fingerprints are associated with media content of media streams (e.g., TV shows) and have been verified as commercial-free. In one embodiment, the audio fingerprints stored in the static matching database 152 are the audio fingerprints generated by the fingerprint generation module 120, where the audio fingerprints have been verified by both the commercial detection module 130 and the program guide module 140.

A match between the probe audio fingerprint of the audio signal 102 and a reference fingerprint stored in the static matching database 152 indicates that the media content of the media stream associated with the audio signal 102 is commercial free. It is noted that a match between the probe audio fingerprint of the audio signal 102 and a reference fingerprint for an audio stream (e.g., music songs) stored in the static matching database 152 may not affirmatively indicate that the audio stream has no commercial content because the audio stream may be the sound track for a commercial consisting of only audio data. In such scenario, the program guide module 140 can further investigate the match.

The commercial database 154 stores reference audio fingerprints generated for audio signals received by the commercial detection system 100, where the audio fingerprints are associated with media content that has been verified to be a commercial. In one embodiment, the commercial database 154 stores audio fingerprints for known commercials that were recognized by human in advance. In another embodiment, the commercial database 154 stores audio fingerprints of commercials detected by the commercial detection system 100 in real time. If a match between the probe audio fingerprint of the audio signal 102 and a reference fingerprint stored in the commercial database 154 is found, the media stream associated with the probe audio fingerprint is determined to have commercial content.

In addition to storing the reference audio fingerprints, each database described above, the real-time matching database 150, the static matching database 152 and the commercial database 154, may store identifying information and/or other information related to the audio signals from which the reference audio fingerprints were generated. The identifying information may be any data suitable for identifying an audio signal. For example, the identifying information associated with a reference audio fingerprint includes title, artist, album, publisher information for the corresponding audio signal. Identifying information may also include data indicating the source of an audio signal corresponding to a reference audio fingerprint. For example, the reference audio signal of an audio-based advertisement may be broadcast from a specific geographic location, so a reference audio fingerprint corresponding to the reference audio signal is associated with an identifier indicating the geographic location (e.g., a location name, global positioning system (GPS) coordinates, etc.). The commercial database 154 may include a confidence level for a reference audio fingerprint, which can be updated time from time (increase or decrease depending on the new available information).

System Architecture

Figure 2:
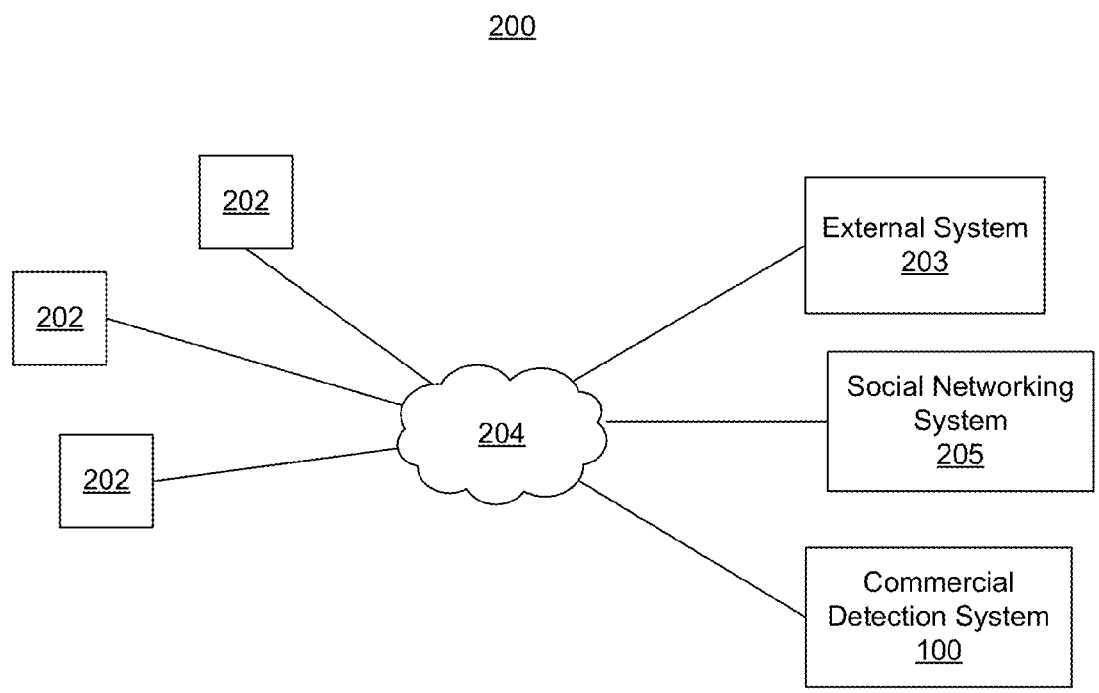
FIG. 2 is a block diagram of a system environment including a commercial detection system in accordance with an embodiment.

FIG. 2 is a block diagram illustrating one embodiment of a system environment 200 including a commercial detection system 100. As shown in FIG. 2, the system environment 200 includes one or more client devices 202, one or more external systems 203, the commercial detection system 100 and a social networking system 205 connected through a network 204. While FIG. 2 shows three client devices 202, one social networking system 205, and one external system 203, it should be appreciated that any number of these entities (including millions) may be included. In alternative configurations, different and/or additional entities may also be included in the system environment 200. Furthermore, in some embodiments, the commercial detection system 100 can be a system or module running on or otherwise included within one of the other entities shown in FIG. 2.

A client device 202 is a computing device capable of receiving user input, as well as transmitting and/or receiving data via the network 204. In one embodiment, a client device 202 sends a request to the commercial detection system 100 to identify an audio signal captured or otherwise obtained by the client device 202. The client device 202 may additionally provide the audio signal or a digital representation of the audio signal to the commercial detection system 100. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the commercial detection system 100, the social networking system 205, and/or one or more external systems 203. In one embodiment, the client devices 202 also allow various users to communicate with one another via the social networking system 205.

The network 204 may be any wired or wireless local area network (LAN) and/or wide area network (WAN), such as an intranet, an extranet, or the Internet. The network 204 provides communication capabilities between one or more client devices 202, the commercial detection system 100, the social networking system 205, and/or one or more external systems 203. In various embodiments the network 204 uses standard communication technologies and/or protocols. Examples of technologies used by the network 204 include Ethernet, 802.11, 3G, 4G, 802.16, or any other suitable communication technology. The network 204 may use wireless, wired, or a combination of wireless and wired communication technologies. Examples of protocols used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the commercial detection system 100, the social networking system 205, and/or with one or more client devices 202. The external system 203 provides content and/or other information to one or more client devices 202, the social networking system 205, and/or to the commercial detection system 100. Examples of content and/or other information provided by the external system 203 include identifying information associated with reference audio fingerprints, content (e.g., audio, video, etc.) associated with identifying information, or other suitable information.

The social networking system 205 is coupled to the network 204 to communicate with the commercial detection system 100, the external system 203, and/or with one or more client devices 202. The social networking system 205 is a computing system allowing its users to communicate, or to otherwise interact, with each other and to access content. The social networking system 205 additionally permits users to establish connections (e.g., friendship type relationships, follower type relationships, etc.) between one another. Though the social networking system 205 is included in the embodiment of FIG. 2, the commercial detection system 100 can operate in environments that do not include a social networking system, including within any environment for which commercial detection in media streams is desirable. Further, in some embodiments, the commercial detection system 100 is a component of the social networking system such that the social networking system performs the functions of the commercial detection system 100.

In one embodiment, the social networking system 205 stores user accounts describing its users. User profiles are associated with the user accounts and include information describing the users, such as demographic data (e.g., gender information), biographic data (e.g., interest information), etc. Using information in the user profiles, connections between users, and any other suitable information, the social networking system 205 maintains a social graph of nodes interconnected by edges. Each node in the social graph represents an object associated with the social networking system 205 that may act on and/or be acted upon by another object associated with the social networking system 205. An edge between two nodes in the social graph represents a particular kind of connection between the two nodes. For example, an edge may indicate that a particular user of the social networking system 205 is currently "listening" to a certain song. In one embodiment, the social networking system 205 may use edges to generate stories describing actions performed by users, which are communicated to one or more additional users connected to the users through the social networking system 205. For example, the social networking system 205 may present a story about a user listening to a song to additional users connected to the user. A user listening to a song can record a portion of the audio with a client device 202 and the audio can be provided to the social networking system 205 that can then identify the audio as corresponding to a particular song, and can provide a story to one or more of the user's connections that the user is listening to the song. The commercial detection system 100 to can be used by the social networking system 205 in this identification process to determine whether the audio recording is a commercial and to ensure the audio recording is correctly identified for inclusion in the story.

Commercial Detection Based on Audio Fingerprinting

The commercial detection module 130 detects commercials in a media stream based on the audio fingerprints associated with the audio signals of the media stream. The program guide module 140 verifies the detection results from the commercial detection module 130. To detect commercials based on the probe audio fingerprint of the audio signal 102, the commercial detection module 130 matches the probe audio fingerprint of the audio signal 102 against reference audio fingerprints stored in at least one of the real-time matching database 150, the static matching database 152 and the commercial database 154. Based on the comparison, the commercial detection module 130 determines whether commercial content is present in the media stream.

To match the probe audio fingerprint with a reference audio fingerprint, the commercial detection module 120 calculates a correlation between the probe audio fingerprint and the reference audio fingerprint. The correlation measures the similarity between the acoustic characteristics of the probe audio fingerprint and the acoustic characteristics of the reference audio fingerprint. In one embodiment, the commercial detection module 130 measures the similarity between the acoustic characteristics of the probe audio fingerprint and the acoustic characteristics of the reference audio fingerprint based on DCT sign-only correction between the probe audio fingerprint and the reference audio fingerprint. It is noted that DCT sign-only correlation between the probe audio fingerprint and the reference audio fingerprint closely approximates the similarity between the acoustic characteristics of the probe audio fingerprint and the audio characteristics of the reference audio fingerprint. Examples of the DCT sign-only correlation are described in U.S. application Ser. No. 14/153, 404, which is incorporated by reference herein in its entirety.

A same commercial can repeat on a same broadcast channel and on other broadcast channels at various times. A single match between the probe audio fingerprint and a reference audio fingerprint in the real-time matching database 150 may not affirmatively indicate that the media stream associated with the probe audio fingerprint has commercial content. In one embodiment, the commercial detection module 130 determines whether the same match is observed across multiple broadcast channels over a specified period of time. Responsive to the number of same matches exceeding a predetermined threshold, the commercial detection module 130 determines that the media stream associated with the probe audio fingerprint has commercial content. Examples of the predetermined threshold include twenty matches over five broadcast channels and ten matches in three different broadcast programs.

Figure 6:
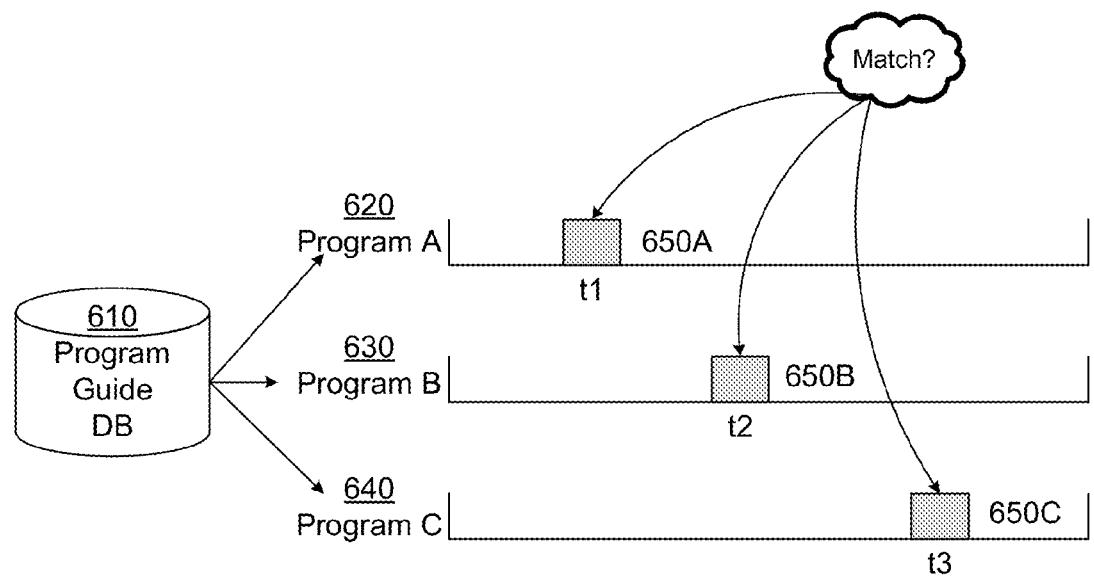
FIG. 6 is an example of commercial detection over multiple media broadcast channels in accordance with an embodiment.

Turning now to FIG. 6, an example is shown illustrating commercial detection over multiple media broadcast channels in accordance with an embodiment. The example in FIG. 6 shows a program guide database 610 that stores program guide information (e.g., scheduling information) for known TV shows for TV broadcast channels and for songs and playlists for music channels and audio stations. In one embodiment, the program guide database 610 stores three different broadcast programs (e.g., three different TV shows), Program A 620, Program B 630 and Program C 640. The commercial detection system 100 generates audio fingerprints for audio signals of the three broadcast programs, e.g., audio fingerprint 650A for an audio signal associated with Program A, audio fingerprint 650B for an audio signal associated with Program B and audio fingerprint 650C for an audio signal associated with Program C. The audio fingerprint 605A corresponds to the audio content of Program A at time t1; the audio fingerprint 605B corresponds to the audio content of Program B at time t2; and the audio fingerprint 605C corresponds to the audio content of Program C at time t3. The timing parameters, t1, t2 and t3, represent different time slots when the audio content of Program A, Program B and Program C, respectively, is played.

The commercial detection module 130 matches the audio fingerprint 650A with the reference audio fingerprints stored in the real-time matching database 150 and finds a match. For example, audio fingerprints 650B and 650C could be reference audio fingerprints with which probe audio fingerprint 650A might be matched. To confirm that Program A indeed contains commercial content, the commercial detection module 130 checks whether the same match is observed over Program B and Program C. For example, if probe audio fingerprint 650A is found to match reference audio fingerprints 650B and 650C, since these are fingerprints across various different programs (e.g., different TV shows), it is likely that these are commercials. Multiple different programs are unlikely to have the same content displayed during the program other than a commercial. Assuming that the commercial detection module 130 finds two more matches over Program B and Program C, and that the predetermined threshold is three matches over three different broadcast programs, the commercial detection module 130 determines that Program A has commercial content, and a summary of the audio characteristics of the commercial content is represented by the audio fingerprint 650A. Thus, in this embodiment, the commercial detection module 130 compares a probe fingerprint from one program to reference fingerprints taken from other programs. If there is a match by the probe fingerprint to some threshold number of reference fingerprints across some threshold number of different programs, then the probe fingerprint is determined to be a fingerprint from a commercial.

This probe fingerprint can then be stored in the commercial database 154. In this manner, the commercial detection system 100 can build a rich database of commercial fingerprints. This rich commercial database 154 can then be used to identify commercials in new audio signals that are received for which fingerprints are generated (or new fingerprints are received). For example, a user might record audio with a client device and the commercial detection system 100 can generate a fingerprint of that audio and compare it to the commercial database 154 to determine if there is a match. If so, the user is determined to be listening to a commercial. Where the user is recording audio for conveying a story to connections on a social networking system, the social networking system can use this information to provide a story that correctly identifies the audio being listened to by the user.

Figure 3:
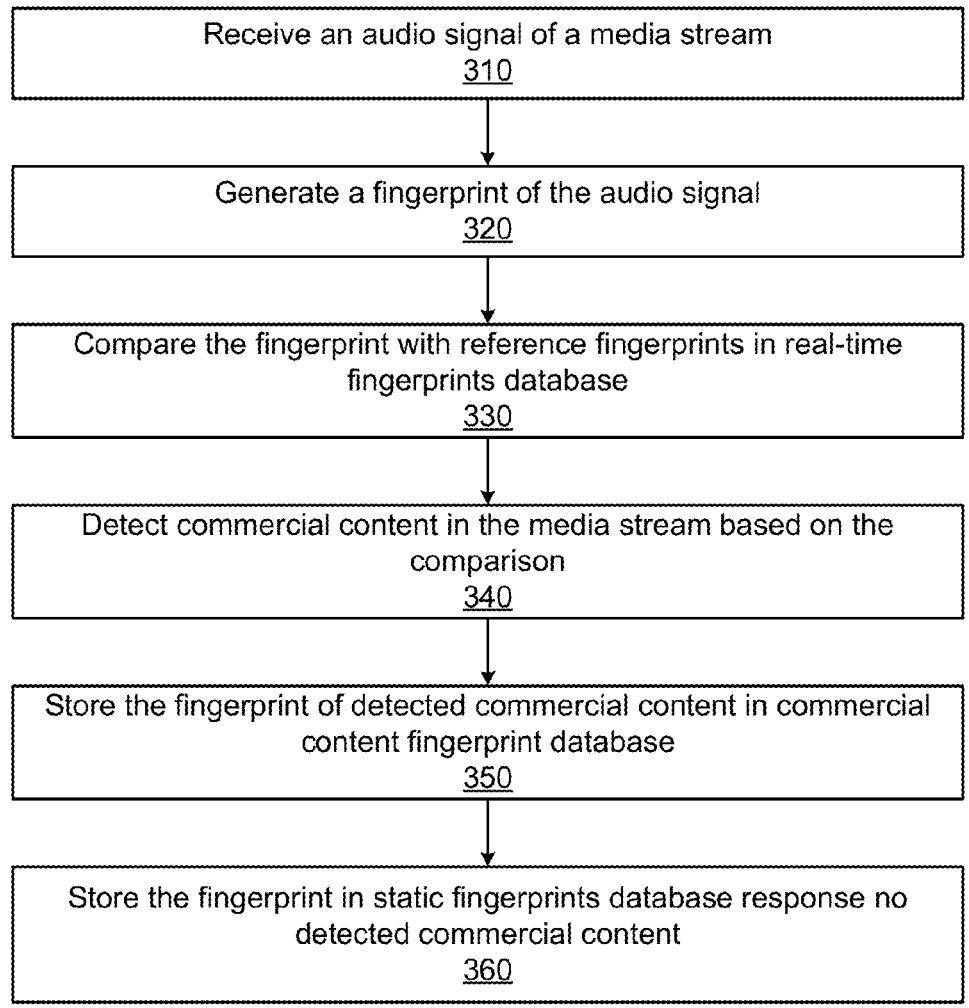
FIG. 3 is a flowchart of detecting commercials in a media stream in accordance with an embodiment.

FIG. 3 is a flowchart illustrating a method of detecting commercials in a media stream by the commercial detection system 100 in accordance with an embodiment. This method can be used, for example, to build the databases illustrated in FIG. 1, including building a rich commercial database 154 as explained above. Initially, the commercial detection system 100 receives 310 an audio signal associated with the media stream and the commercial detection system 100 generates 320 a probe audio fingerprint for the audio signal. The commercial detection system 100 compares 330 the probe audio fingerprint with reference audio fingerprints stored in the real-time matching database150 to find any match. Based on the comparison, the commercial detection system 100 detects 340 whether there is commercial content in the media stream associated with the probe audio fingerprint.

In one embodiment as illustrated in FIG. 6, responsive to a match found between the probe audio fingerprint and a reference audio fingerprint in the real-time matching database 150, the commercial detection system 100 determines whether the same match is observed over multiple broadcast channels. If the number of the matches exceeds a predetermined threshold value, the commercial detection system 100 determines that the media program associated with the probe audio fingerprint has commercial content.

In response to the determination that the media stream associated with the probe audio fingerprint includes commercial content, the commercial detection system 100 stores 350 the probe audio fingerprint in the commercial database 154. If the commercial detection system 100 determines that the media program does not include commercial content, the commercial detection module stores 360 the probe audio fingerprint in the static matching database 152.

To increase accuracy of commercial detection based on audio fingerprinting, the commercial detection system 100 applies a trained analysis model to acoustic features of media streams. In one embodiment, the commercial detection module 130 trains the analysis model using one or more machine learning algorithms to analyze selected acoustic features of audio signals. Machine learning techniques and algorithms include, but are not limited to, neural networks, naïve Bayes, support vector machines and machine learning used in Hive frameworks.

The commercial detection system 100 receives audio signals from media content provided by content providers and extracts acoustic features, e.g., MFCC and standard deviation of feature vectors, from the audio signals. The extracted acoustic features are clustered and classified by the analysis model using one or more machine learning algorithms. The commercial detection system 100 generates audio fingerprints of audio signals corresponding to the classified acoustic features. For example, the commercial detection system 100 can select a set of acoustic features of known commercials and generates signature audio fingerprints of the known commercials based on the selected acoustic features.

When presented with a probe audio fingerprint, the trained analysis model compares the acoustic features summarized by the probe audio fingerprint with the classified acoustic features summarized by signature audio fingerprints of known commercials. Based on the analysis, the trained analysis model determines the degree of similarities between the acoustic features associated with the probe audio fingerprint and the acoustic features of a signature audio fingerprint. A confidence score can be assigned to the probe audio fingerprint for each comparison and the confidence score indicates a likelihood that the media stream associated with the probe audio fingerprint has commercial content. A higher confidence score associated with a media stream indicates that the media stream is more likely to have commercial content than a media stream having a lower confidence score.

Figure 4:
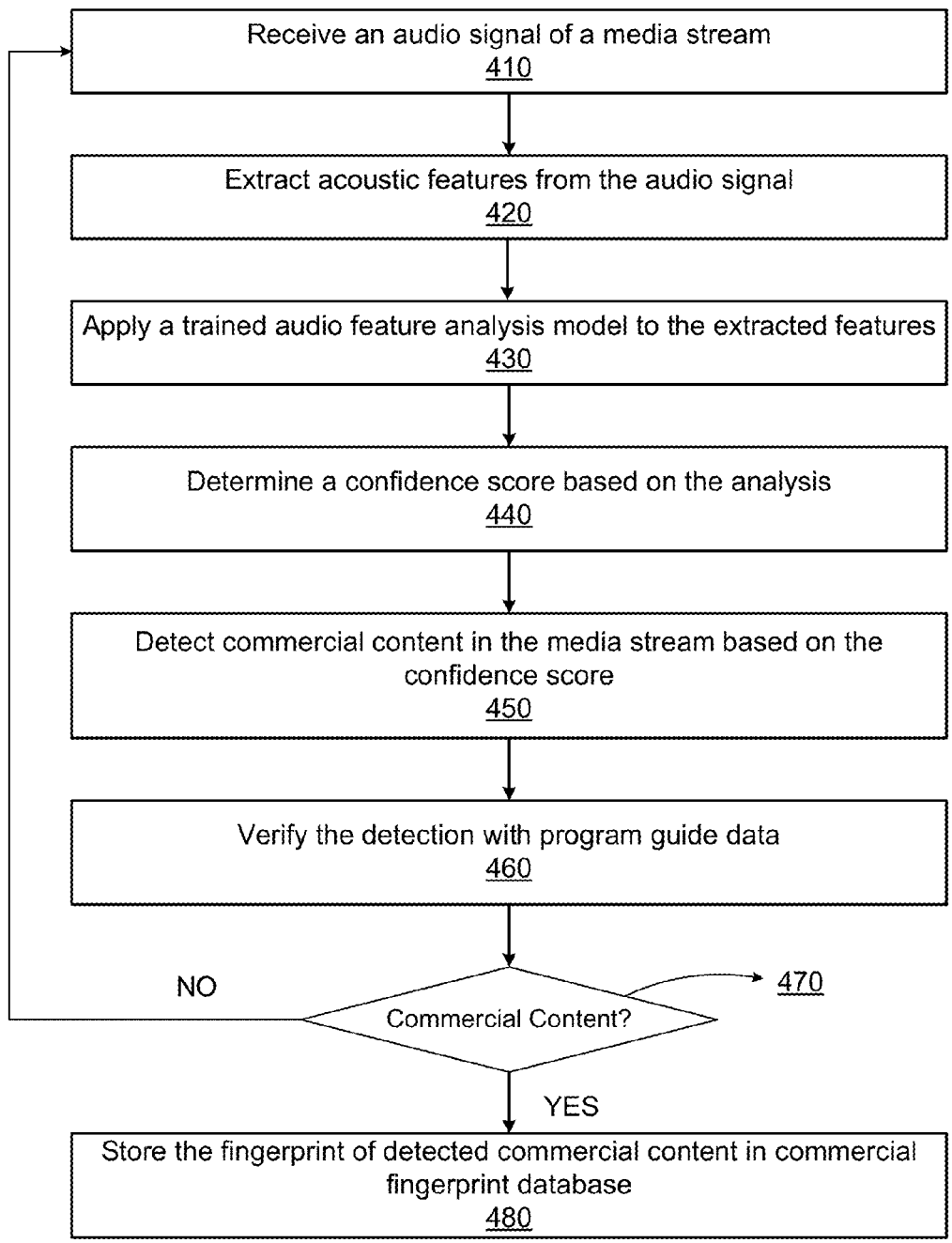
FIG. 4 is a flowchart of detecting commercials in a media stream in accordance with another embodiment.

FIG. 4 is a flowchart illustrating a method of detecting commercials in a media stream by the commercial detection system 100 in accordance with another embodiment. As with FIG. 3, this method of FIG. 4 can be used, for example, to build the databases illustrated in FIG. 1, including building a rich commercial database 154 as explained above. However, with FIG. 4, the prediction of whether or not a fingerprint represents a commercial is bolstered using the trained analysis model described above. Initially, the commercial detection system 100 receives 410 an audio signal associated with the media stream and the commercial detection system 100 extracts 420 acoustic features from the audio signal. The commercial detection system 100 applies 430 a trained audio feature analysis model as described above to the extracted features. The trained audio feature analysis model compares the extracted acoustic features of the audio signal with classified acoustic features of known commercials. Based on the analysis, the commercial detection system 100 determines 440 a confidence score for the probe audio fingerprint generated from the audio signal. The commercial detection system 100 detects 450 commercial content in the media stream based on the confidence score.

To further improve commercial detection accuracy, the commercial detection system 100 can verify 460 the detection using program guide information as described above. Responsive to the media stream having commercial content 470, the commercial detection system 100 stores 480 the audio fingerprint of detected commercial content in a commercial fingerprint database, e.g., the commercial database 154 in FIG. 1. Otherwise, the commercial detection system 100 analyzes another audio signal following the steps 410 to 470.

Compared with conventional commercial detection techniques, commercial detection based on audio fingerprinting described above improve commercial detection performance by considering characteristics of repeating commercial across multiple broadcast channels and by reducing false positive detection with a trained analysis model and detection verification using program guide information.

Applications of Commercial Detection Based on Audio Fingerprinting

Figure 5:
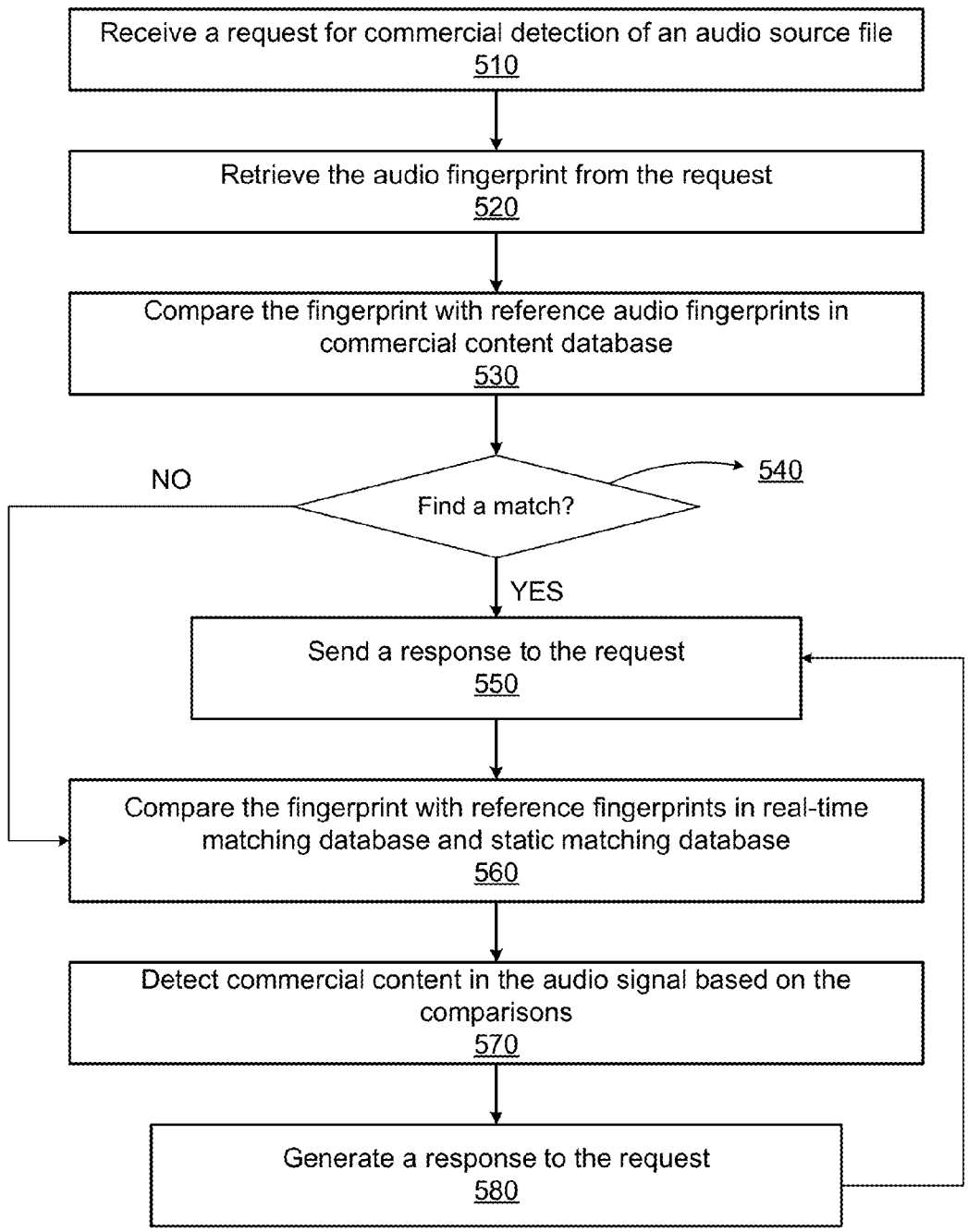
FIG. 5 is a flowchart of detecting commercials in a media stream upon user requests in accordance with an embodiment.

Commercial detection based on audio fingerprinting has a variety of applications, such as for commercial detection in a video stream upon user requests. The identified commercials and their corresponding locations in the media streams help users to skip unwanted commercials. FIG. 5 is a flowchart illustrating a method of detecting commercials in a media stream by the commercial detection system 100 upon a user request in accordance with an embodiment. FIG. 5 thus illustrates the application of the databases that were built using FIG. 3 or 4 for commercial detection. The user request could come, for example, directly from a user or could be a user request submitted by a social networking system based on audio received by the social networking system from the user. Initially, the commercial detection system 100 receives 510 a user request for detection in a media stream, wherein the request identifies the audio portion of the media stream. For example, the user may have recorded some audio with a mobile phone for which the user is requesting an identification to provide a story to the user's social networking connections about what the user is listening to. In one embodiment, the audio portion of the media stream is compactly presented by an audio fingerprint, which is included in the user request. The commercial detection system 100 retrieves 520 the audio fingerprint from the user request. Alternatively, the commercial detection system 100 generates an audio fingerprint by the fingerprint generation module 120 for the audio signals of the media stream.

The commercial detection system 100 compares 530 the audio fingerprint of the media stream with reference audio fingerprints in a commercial content database, e.g., the commercial database 154 in FIG. 1. The reference audio fingerprints stored in the commercial content database are audio fingerprints for media content that has been verified by the commercial detection system 100 as commercial content.

Responsive to finding a match 540 between the audio fingerprint of the media stream with a reference audio fingerprint in the commercial content database, the commercial detection system 550 sends 550 a response to the user request, where the response indicates that the media stream contains commercial content and information describing the detected commercial, e.g., location/timing in the media stream and length of the commercial.

Responsive to no match being found, the commercial detection system 100 can further verify the detection by comparing 560 the audio fingerprint of the media stream with reference audio fingerprints stored in the real-time matching database (e.g., the database 150 in FIG. 1) and/or audio fingerprints stored in the static matching database (e.g., the database 152 in FIG. 1). The commercial detection system 100 detects 570 commercial content in the media stream based on the comparison as described above. The commercial system 100 generates 580 a response to the user request and sends 550 the response to the user request. The response to the user request sent 550 can also be a response to a social networking system request to identify audio provided by a user.

In addition to commercial detection upon user requests as discussed above, the commercial detection based on audio fingerprinting can also be used in commercial detection in speech recognition, closed caption and other content-identification applications. The commercial detection system 100 may observe user interactions with the detected commercials and remove commercial content from media streams. The commercial detection results and observed user interactions with the detected commercials can help content providers and social networking platforms to customize services provided to users and to enhance user experience with media streams. For example, the commercial detection system 100 may interact with the social networking system 205 illustrated in FIG. 2 upon a user click of a detected commercial in a media stream, where the social networking system 205, in turn, links the detected commercial to commercials to be presented at the user's social media account.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving an audio signal including a plurality of frames, each frame representing a portion of the audio signal, the audio signal associated with a media stream on a broadcast channel;
    generating a probe audio fingerprint based on one or more of the plurality of frames;
    comparing the probe audio fingerprint with one or more reference audio fingerprints from a plurality of reference audio fingerprints, a reference audio fingerprint of the plurality of reference audio fingerprints representing a set of acoustic features of an audio signal associated with commercial content;
    determining whether the probe audio fingerprint matches a reference audio fingerprint of the plurality of reference audio fingerprints based on comparison of the probe audio fingerprint and the reference audio fingerprint; and
    responsive to a match between the probe audio fingerprint and the reference audio fingerprint of the plurality of reference audio fingerprints:
        determining whether an audio fingerprint associated with a media stream broadcast over a channel of a plurality of other broadcast channels matches the reference audio fingerprint: and
        determining that the media stream associated with the probe audio fingerprint has commercial content in response to the number of matches between the audio fingerprints associated with the plurality of other broadcast channels and the reference audio fingerprint exceeding a predetermined threshold.

2. The computer-implemented method of claim 1, further comprising:
    responsive to a match between the probe audio fingerprint and the reference audio fingerprint of the plurality of reference audio fingerprints:
        determining whether an audio fingerprint associated with a media stream of a plurality of other media streams matches the reference audio fingerprint;
        determining that the media stream associated with the probe audio fingerprint has commercial content in response to the number of matches between the audio fingerprints associated with the plurality of other media streams and the reference audio fingerprint exceeding a predetermined threshold.

3. The computer-implemented method of claim 1, further comprising:
    receiving program guide information associated with the media stream on the broadcast channel, the program guide information describing scheduling information of known commercials broadcast along with the media stream on the broadcast channel; and
    verifying the commercial content determination based on the program guide information.

4. The computer-implemented method of claim 1, further comprising:
    receiving program guide information associated with other media streams on the plurality of other broadcast channels, the program guide information describing scheduling information of known commercials broadcast along with the other media streams on the other broadcast channels.

5. The computer-implemented method of claim 1, further comprising:
    extracting a plurality of acoustic features from the audio signal associated with the media stream;
    applying a trained analysis model to the extracted acoustic features of the audio signal;
    assigning a confidence score to the probe audio signal based on the analysis of the extracted acoustic features of the media stream;
    detecting commercial content in the media stream based on the confidence score assigned to the probe audio signal.

6. The computer-implemented method of claim 5, wherein the plurality of acoustic features of the audio signal comprise a plurality of acoustic features of the audio signal in frequency domain comprising:
    magnitude spectrum of the audio signal;
    Mel-frequency cepstral coefficients of the audios signal;
    spectral bandwidth of the audio signal;
    spectral flatness measure of the audio signal;
    spectral fluctuation of the audio signal;
    number of extreme value frequencies; and
    number of silent frequencies.

7. The computer-implemented method of claim 5, wherein the plurality of acoustic features of the audio signal comprise a plurality of acoustic features of the audio signal in time domain comprising mean, standard deviation and covariance matrix of features vectors of the audio signal, the feature vectors of the audio signal being observed over a predefined time window.

8. The computer-implemented method of claim 5, wherein the confidence score assigned to the probe audio fingerprint indicates a likelihood that the media stream associated with the probe audio fingerprint has commercial content.

9. The computer-implemented method of claim 5, wherein assigning a confidence score to the probe audio signal comprises:
    determining a degree of similarities between the acoustic features associated with the probe audio fingerprint and the acoustic features of reference audio fingerprints of known commercial content.

10. A non-transitory computer-readable storage medium storing computer program instructions, executed by a computer processor, for detecting commercial in a media stream, the computer program instructions comprising instructions for:
    receiving an audio signal including a plurality of frames, each frame representing a portion of the audio signal, the audio signal associated with a media stream on a broadcast channel;

generating a probe audio fingerprint based on one or more of the plurality of frames;

comparing the probe audio fingerprint with one or more reference audio fingerprints from a plurality of reference audio fingerprints, a reference audio fingerprint of the plurality of reference audio fingerprints representing a set of acoustic features of an audio signal associated with commercial content;

determining whether the probe audio fingerprint matches a reference audio fingerprint of the plurality of reference audio fingerprints based on comparison of the probe audio fingerprint and the reference audio fingerprint; and responsive to a match between the probe audio fingerprint and the reference audio fingerprint of the plurality of reference audio fingerprints:
  determining whether an audio fingerprint associated with a media stream broadcast over a channel of a plurality of other broadcast channels matches the reference audio fingerprint; and
  determining that the media stream associated with the probe audio fingerprint has commercial content in response to the number of matches between the audio fingerprints associated with the plurality of other broadcast channels and the reference audio fingerprint exceeding a predetermined threshold.

11. The computer-readable storage medium of claim 10, further comprising computer program instructions for:
  responsive to a match between the probe audio fingerprint and the reference audio fingerprint of the plurality of reference audio fingerprints:
    determining whether an audio fingerprint associated with a media stream of a plurality of other media streams matches the reference audio fingerprint;
    determining that the media stream associated with the probe audio fingerprint has commercial content in response to the number of matches between the audio fingerprints associated with the plurality of other media streams and the reference audio fingerprint exceeding a predetermined threshold.

12. The computer-readable storage medium of claim 10, further comprising computer program instructions for:
  receiving program guide information associated with the media stream on the broadcast channel, the program guide information describing scheduling information of known commercials broadcast along with the media stream on the broadcast channel; and
  verifying the commercial content determination based on the program guide information.

13. The computer-readable storage medium of claim 10, further comprising computer program instructions for:
  receiving program guide information associated with other media streams on the plurality of other broadcast channels, the program guide information describing scheduling information of known commercials broadcast along with the other media streams on the other broadcast channels.

14. The computer-readable storage medium of claim 10, further comprising computer program instructions for:
  extracting a plurality of acoustic features from the audio signal associated with the media stream;
  applying a trained analysis model to the extracted acoustic features of the audio signal;
  assigning a confidence score to the probe audio signal based on the analysis of the extracted acoustic features of the media stream;
  detecting commercial content in the media stream based on the confidence score assigned to the probe audio signal.

15. The computer-readable storage medium of claim 14, wherein the plurality of acoustic features of the audio signal comprise a plurality of acoustic features of the audio signal in frequency domain comprising:
  magnitude spectrum of the audio signal;
  Mel-frequency cepstral coefficients of the audios signal;
  spectral bandwidth of the audio signal;
  spectral flatness measure of the audio signal;
  spectral fluctuation of the audio signal;
  number of extreme value frequencies; and
  number of silent frequencies.

16. The computer-readable storage medium of claim 14, wherein the plurality of acoustic features of the audio signal comprise a plurality of acoustic features of the audio signal in time domain comprising mean, standard deviation and covariance matrix of features vectors of the audio signal, the feature vectors of the audio signal being observed over a predefined time window.

17. The computer-readable storage medium of claim 14, wherein the confidence score assigned to the probe audio fingerprint indicates a likelihood that the media stream associated with the probe audio fingerprint has commercial content.

18. The computer-readable storage medium of claim 14, wherein the computer program instructions for assigning a confidence score to the probe audio signal comprise instructions for:
  determining a degree of similarities between the acoustic features associated with the probe audio fingerprint and the acoustic features of reference audio fingerprints of known commercial content.

* * * * *